Patented July 11, 1939

2,165,951

UNITED STATES PATENT OFFICE 2,165,951

PLASTICIZER

Charles F. Winans, Akron, Ohio, assignor to Wingfoot Corporation, Wilmington, Del., a corporation of Delaware No Drawing. Application September 9, 1936, Serial No. 100,033

6 Claims. (Cl. 260—110)

This invention relates to plasticizers or softeners and to compositions containing them.

Plastic compositions, such as phenol aldehyde plastics; urea resins; condensation products of polyhydric alcohols and polybasic acids; condensation derivatives of rubber, such as the condensation derivative of rubber obtainable by reacting rubber with chlorostannic acid as described in U. S. Patent No. 1,797,188 to Bruson; rubber hydrohalides, such as the rubber hydrochloride described in U. S. Patent No. 1,989,632 to Calvert, chlorinated rubber plastics, and many other synthetic resins such as the cellulose ester or ether plastics, etc., often require a plasticizer or softener to make them less brittle and more easily workable. Where these organic plastics are used in lacquers and other coating compositions plasticizers are often desirable to increase the flexibility of the film and ease of flowing of the composition.

Many materials have been proposed as plasticizers heretofore. Among these are the alkyl benzenes and alkyl naphthalenes. These compounds possess certain disadvantages: they are somewhat unstable toward atmospheric exposure as a result of their aromatic structure and tend to be dark in color. In some uses, these disadvantages are decidedly undesirable.

According to this invention, there are used as plasticizers or softeners alicyclic compounds containing in the ring one or more saturated hydrocarbon substituents, the total number of carbon atoms in the substituents being at least four. Illustrative are the alkylated cyclohexanes, the alkylated tetra- and deca-hydro naphthalenes, and the alkylated dicyclohexanes in each of which the alkyl group or groups contain as a total at least four carbon atoms. The effectiveness of a plasticizer or softener is determined by its characteristics, such as its solvent power for the plastic or plastics with which it is associated, and its melting point, boiling point, hardness, etc. The alkyl alicyclic compounds in which the alkyl group or groups have less than a total of four carbon atoms generally have a boiling point so low that they are too volatile for successful use. Accordingly, such compounds are not included in this invention.

While the completely saturated alicyclic compounds are preferred in the practice of the invention, the alkyl tetrahydro naphthalenes in which the alkyl group or groups contain as a total at least four carbon atoms also may be employed successfully as plasticizers, as they are quite stable toward atmospheric oxygen and are water white even though they do contain a few unsaturated linkages. The preferred alkylated groups are the amyl groups and, of the amyl alicyclic compounds, the poly amyl alicyclic compounds appear to be the most desirable plasticizers.

Although the plasticizers of this invention are applicable to all plastic compositions and corresponding lacquers, they are particularly effective with condensation derivatives of rubber such as the substantially unoxidized condensation derivative of rubber which is obtainable by decomposition with water of a conversion product obtainable by the treatment of rubber in solution with chlorostannic acid. They may, of course, be used with the plastics hereinabove referred to as well as many others such as the polymerized cumaron and indene resins and the casein plastics. Natural resin compositions, such as those containing copal, shellac, dammar, etc. may also be effectively plasticized by the plasticizers of this invention which is, therefore, not to be considered limited to lacquers or other plastic compositions containing synthetic plastics. Other plastic compositions with which the plasticizers of this invention may be employed are the halogenated rubber hydrohalides, such as brominated rubber hydrochloride and chlorinated rubber hydrochloride. The plasticizers of the invention may be used also in modified resin compositions containing two or more organic plastics.

The plasticizers of the invention are preferably prepared by the catalytic hydrogenation of the corresponding alkylated aromatic compounds, although it will be understood other methods may be used.

The amyl cyclohexanes and amyl decahydro naphthalenes may be used to illustrate the invention. These compounds may be prepared by catalytically hydrogenating the corresponding amyl benzene or amyl naphthalene in the liquid phase, no unusual precautions being necessary, although it is desirable for efficient results that one of the more active hydrogenation catalysts known to the art be used. The base metal hydrogenation catalysts are preferred and, of these, the metallic nickel catalysts.

Where the catalyst employed is one subject to contamination or poisoning by impurities, such as sulphur and halogens, as is the case with nickel catalysts, it is preferable that the alkylated aromatic compound be substantially free from such impurities. Otherwise, the activity of the catalyst will be either greatly reduced or destroyed.

One catalyst found particularly useful in preparing the plasticizers of this invention is the nickel catalyst prepared by the treatment of a nickel alloy, such as nickel-aluminum, or nickel silicon, with aqueous alkalis, as described in United States Patent No. 1,628,190 to Raney. Another nickel catalyst which may be employed with excellent results is the supported nickel catalyst prepared as described in United States Patent No. 2,040,233 to Adkins.

Diamyl naphthalene may be hydrogenated as follows:

Five hundred and fifty grams of commercial x—x' diamyl naphthalene, boiling at 325-345° C., were heated in an open beaker with 30 grams of a Raney nickel catalyst, prepared from a nickel aluminum alloy as previously described, to drive out any alcohol or water adhering thereto which would cause lumping of the catalyst with an attendant lowering of its efficiency in the hydrogenation. When all the water was gone, as shown by the formation of a suspension of the catalyst in the diamyl naphthalene, the mixture was charged into a steel autoclave having a capacity of about 900 cc. Hydrogen was admitted to about 1950 pounds per square inch, agitation was started, and heat supplied. Absorption of hydrogen began at about 75-100° C. with the formation of diamyl tetrahydronaphthalene. This formation is complete at about 150-175° C. at which point further hydrogenation to diamyl decahydro naphthalene begins. The reaction was completed at 250°, taking a total time of about three and three-quarter hours, of which the last two and a quarter hour period was at 250° C. The mixture was allowed to cool, filtered to give a water-white oily liquid, and distilled in vacuo. The clear, colorless mixture of compounds comprising the diamyl decahydro naphthalenes distilled at 190°-225° C. under 25 mm. pressure. The yield was 98.8% of theoretical. By stopping the reaction after the formation of the diamyl tetrahydro naphthalenes, they may be obtained too in a substantially quantitative yield. They are high boiling, colorless liquids.

Similarly, 350 grams of polyamyl naphthalene comprising a mixture of di-, tri- and higher amyl naphthalenes, were hydrogenated in the presence of 25 grams of Raney nickel catalyst. A hydrogen pressure of 60-130 atmosphere was used and the charge was heated to 300° C. over a period of two hours and held at that temperature for a further three hours. The resultant polyamyl decahydro naphthalene was obtained as a water-white, odorless viscous oil.

Instead of using diamyl naphthalene and polyamyl naphthalene, the hydrogenations may be made on amyl benzene, diamyl benzene, triamyl benzene, and amyl naphthalene. All of these materials are obtainable in commercial grade. As such, they are mixtures in which the type and position of the amyl groups is unknown. This is often of no consequence, since in many cases the mixtures are satisfactory without identification and separation. However, it is not intended that this shall be construed as a limitation of the invention, which is, on the contrary, also meant to include isolated compounds of known structure or any of their mixtures.

Diamyl cyclohexane is a water-white liquid boiling at 235-275° C., while triamyl cyclohexane is a water-white liquid boiling at 285-340° C. Mono amyl decahydro naphthalene similarly is water-white and boils at 275-310° C.

Also, instead of amyl compounds, methyl, ethyl, propyl, butyl, hexyl, or higher substituted compounds may be employed in each of which compounds the total number of carbon atoms in the alkylated group or groups is at least four. Thus, other plasticizers of the invention are methyl butyl tetrahydro and decahydro naphthalenes, ethyl tetrahydro and decahydro naphthalenes, tetramethyl cyclohexanes, tetraethyl cyclohexanes, tetramethyl tetrahydro and decahydro naphthalenes, triethyl cyclohexanes, dipropyl tetrahydro and decahydro naphthalenes, heptyl cyclohexane, dibutyl cyclohexanes, dibutyl tetrahydro and decahydro naphthalenes, alpha or beta cyclohexyl decahydro naphthalene, isobutyl decahydro naphthalene, tri- and tetra-isopropyl tetrahydro and decahydro naphthalenes, butylated bicyclohexyl (obtained by the reduction of butyl diphenyl), amyl hydrogenated anthracene, butylated hydrogenated phenanthrene, tricyclohexyl, and bidecahydro naphthyl. Others are tributyl cyclohexane, butylated or amylated hydrogenated anthracene, phenanthrenes, diphenyls and the like. Still others are methyl hexyl cyclohexanes, ethyl amyl tetrahydro and decahydro naphthalenes, methyl ethyl tetrahydro and decahydro naphthalenes, methyl butyl cyclohexanes, etc. All of these compounds may be prepared by processes similar to that illustrated for the amyl decahydro naphthalenes.

It will, of course, be understood that these compounds are not limitative of the invention but are merely representative. Any sufficiently non-volatile liquid, alkylated alicyclic compound in which the number of carbon atoms in the alkylated portion of the compound is at least four may be employed. Boiling point is not a strictly true index of the volatility of a material used as a plasticizer. There are other factors, such as solubility, retention by the resin, etc., which greatly influence the rate of evaporation. However, boiling point may be taken as an approximate index of suitability as a plasticizer from the standpoint of volatility. Therefore, while other alkylated alicyclic compounds may be used, the more desirable compounds are those liquids boiling above about 200° C. Some of the alicyclic compounds of the invention are low melting solids. They too may be employed. Sometimes it is desirable to use them in admixture with alkylated alicyclic compounds which are liquids.

The products of the invention may be incorporated into plastic compositions and mixtures thereof to excellent advantage. Illustrative are the following examples which are to be understood as representative and not limitative of the invention.

*Example 1*

In a series of tests with a paint containing a substantially unoxidized condensation derivative of rubber which is obtainable by decomposition with water of a conversion product obtainable by the treatment of rubber in solution with chlorostannic acid, definite plasticizing action was noticeable with 5% by weight of diamyl decahydronaphthalene based on the rubber condensation derivative. With 50% diamyl decahydro naphthalene, there was a slight surface tack in the dried film. The following formula employing 25% plasticizer, based on the resin, is illustrative of a preferred composition:

| | Parts by weight |
|---|---|
| Resin (chlorostannic acid reaction product of rubber) | 100 |
| Cryptone (high ZnS lithopone) | 230 |
| Xylene | 300 |
| Gasoline (B. P. 40-145° C.) | 300 |
| Diamyl decahydro naphthalene | 25 |
| Tung oil | 10 |

Similar results were obtained by the substitution of the diamyl decahydro naphthalene in the above formula by, respectively, mono amyl decahydronaphthalene, diamyl cyclohexane and triamyl cyclohexane. Diamyl decahydro naphthalene seems to give the most efficient results, however.

Example 2

With glyptal solution #2453 (General Electric), which is a solution of glycerol-phthalic anhydride resin in linseed oil, the following results were obtained:

|  | Parts by weight | | | |
| --- | --- | --- | --- | --- |
| Glyptal solution | 10 | 10 | 10 | 10 |
| Toluene | 10 | 10 | 10 | 10 |
| Diamyl decahydro naphthalene | 0 | 0.25 | 1.25 | 2.5 |

|  | Results | | | |
| --- | --- | --- | --- | --- |
| Appearance of film | Uneven. Clear. | Uneven. Clear. | Smooth. Clear. | Smooth. Clear. |
| Tackiness | Slight | Slight | Slight | Tacky. |
| Brittleness | None | None | None | None. |

The unplasticized film in this case was non-brittle, but did not flow out well. When 12.5% plasticizer, based on the glyptal solution was added, the lacquer flowed out evenly to give a smooth film.

Example 3

With cumar resin, an extremely brittle polymerized indene resin, the following results were obtained:

|  | Parts by weight | | | |
| --- | --- | --- | --- | --- |
| Cumar | 5 | 5 | 5 | 5 |
| Toluene | 20 | 20 | 20 | 20 |
| Diamyl decahydro naphthalene | 0 | 0.25 | 1.25 | 2.5 |

|  | Results | | | |
| --- | --- | --- | --- | --- |
| Appearance of film | Clear. Smooth. | Clear. Smooth. | Clear. Smooth. | Clear. Smooth. |
| Brittleness | Much | Slight | None | None. |
| Tackiness | None | None | None | None. |

Diamyl decahydro naphthalene is thus satisfactory in plasticizing cumar type resins. In a simple composition like this the film is, of course, not very tough but still a noticeable improvement has been made by adding the plasticizer.

Example 4

Data obtained with Tornesite, a chlorinated rubber, follow:

|  | Parts by weight | | | |
| --- | --- | --- | --- | --- |
| Tornesite | 5 | 5 | 5 | 5 |
| Toluene | 20 | 20 | 20 | 20 |
| Diamyl decahydronaphthalene | 0 | 0.25 | 1.25 | 2.5 |

|  | Results | | | |
| --- | --- | --- | --- | --- |
| Appearance of film | Clear. Smooth. | Clear. Smooth. | Clear. Smooth. | Clear. Smooth. |
| Brittleness | Much | Slight | Slight | None. |
| Tackiness | None | None | None | None. |

In this case also, definite plasticizing action was found again.

Example 5

A lacquer is prepared from 200 parts by weight of toluene, 25 parts by weight of diamyl decahydro naphthalene and 50 parts by weight of "Amberol", a modified phenol-formaldehyde plastic soluble in toluene. A non-tacky, non-brittle film was obtained by brushing this lacquer.

Example 6

In an unknown varnish, which by itself gives a clear, smooth, brittle film, the addition of 10% by weight of diamyl decahydronaphthalene produced a clear, smooth film which was quite flexible.

Example 7

A film prepared from a 7½% solution of rubber hydrochloride in benzene to which 10% by weight of diamyl decahydro naphthalene, based on the weight of rubber hydrochloride, had been added was transparent, flexible and somewhat elastic. The rubber hydrochloride was prepared as described in United States Patent No. 1,989,632 to W. C. Calvert.

The plasticizers may be incorporated into the plastic composition in any desired manner, as by working on a rubber mill, etc. When they are to be used in a paint mixture, the simplest method of incorporation is simply to dissolve the plastic and the plasticizer in the solvent.

This application is a continuation in part of application Serial No. 57,361, filed January 3, 1936.

Although only the preferred forms of the invention have been described in detail, it will be apparent to those skilled in the art that the invention is not limited thereto but that various modifications may be made therein without departing from the spirit of the invention or the scope of the appended claims, in which it is intended to cover all features of patentable novelty inherent in the invention.

What I claim is:

1. A plasticized composition which comprises a condensation derivative of rubber and an amyl cyclohexane.

2. A plasticized composition which comprises a condensation derivative of rubber and an amyl decahydro naphthalene.

3. A plasticized composition which comprises a condensation derivative of rubber and diamyl decahydro naphthalene.

4. A plasticized composition which comprises a condensation derivative of rubber and an amylated alicyclic compound, the alicyclic group being selected from the group consisting of cyclohexyl, tetrahydro naphthyl and decahydro naphthyl groups.

5. A plastic composition comprising essentially a conversion product obtained by treatment of rubber with chlorostannic acid and an alkyl hydrogenated naphthalene the alkyl group of which contains not less than four carbon atoms.

6. A condensation derivative of rubber plasticized with an alkyl hydrogenated naphthalene the alkyl group of which contains not less than four carbon atoms.

CHARLES F. WINANS.